Jan. 16, 1934.  N. PEDERSEN  1,943,990
REENFORCING CINEMATOGRAPH FILM
Filed May 28, 1931   12 Sheets-Sheet 1
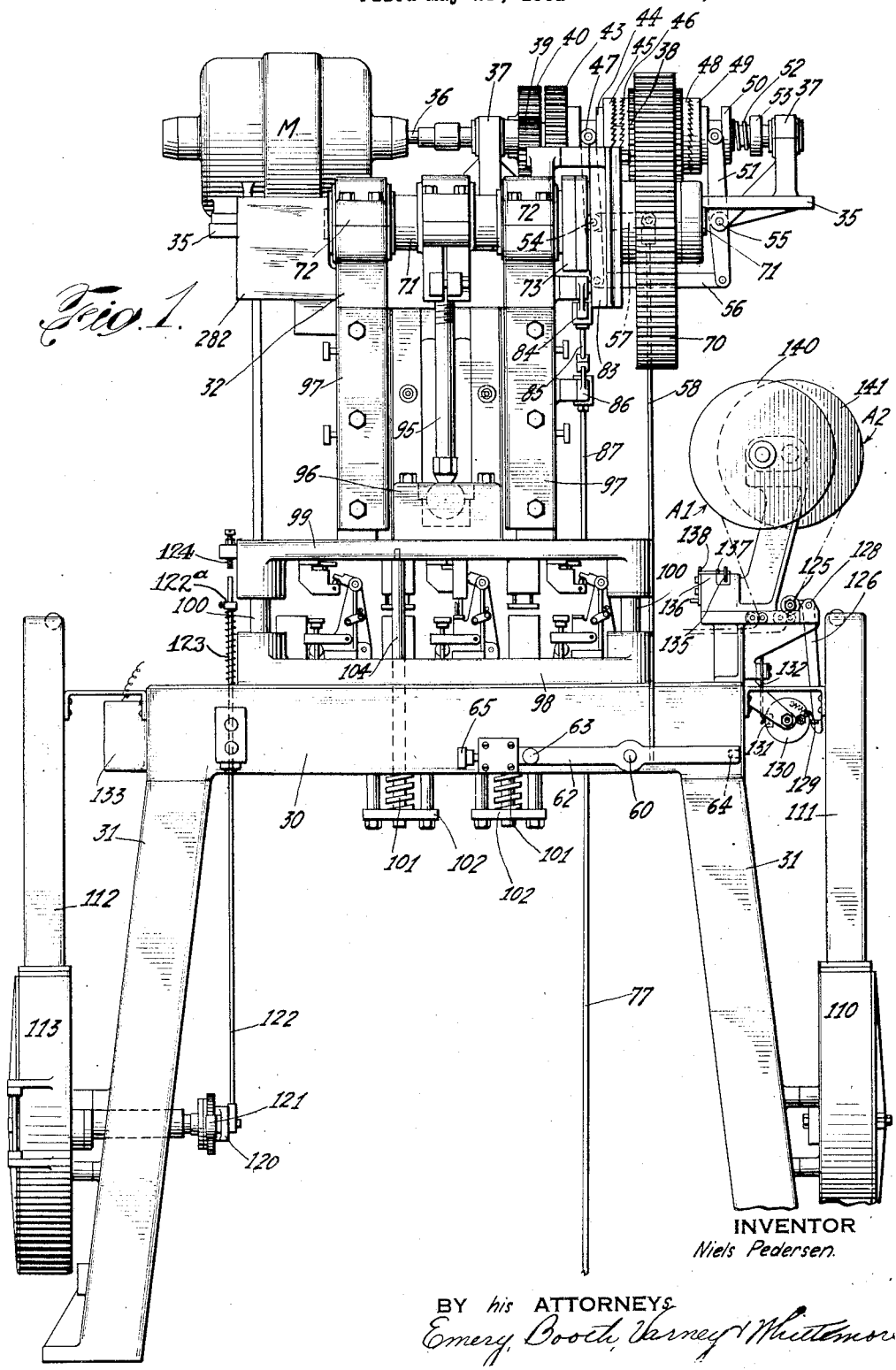
INVENTOR
Niels Pedersen.
BY his ATTORNEYS

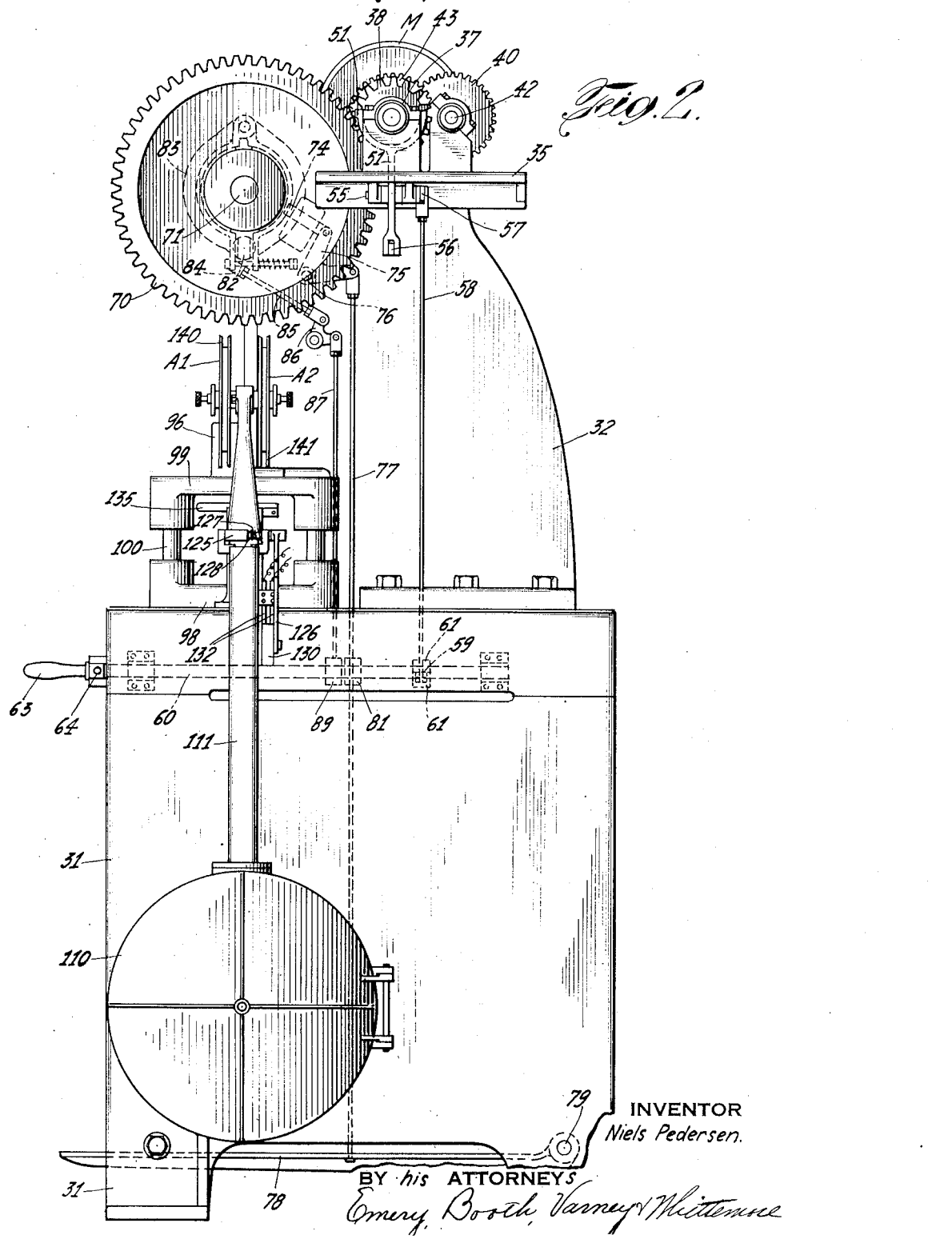

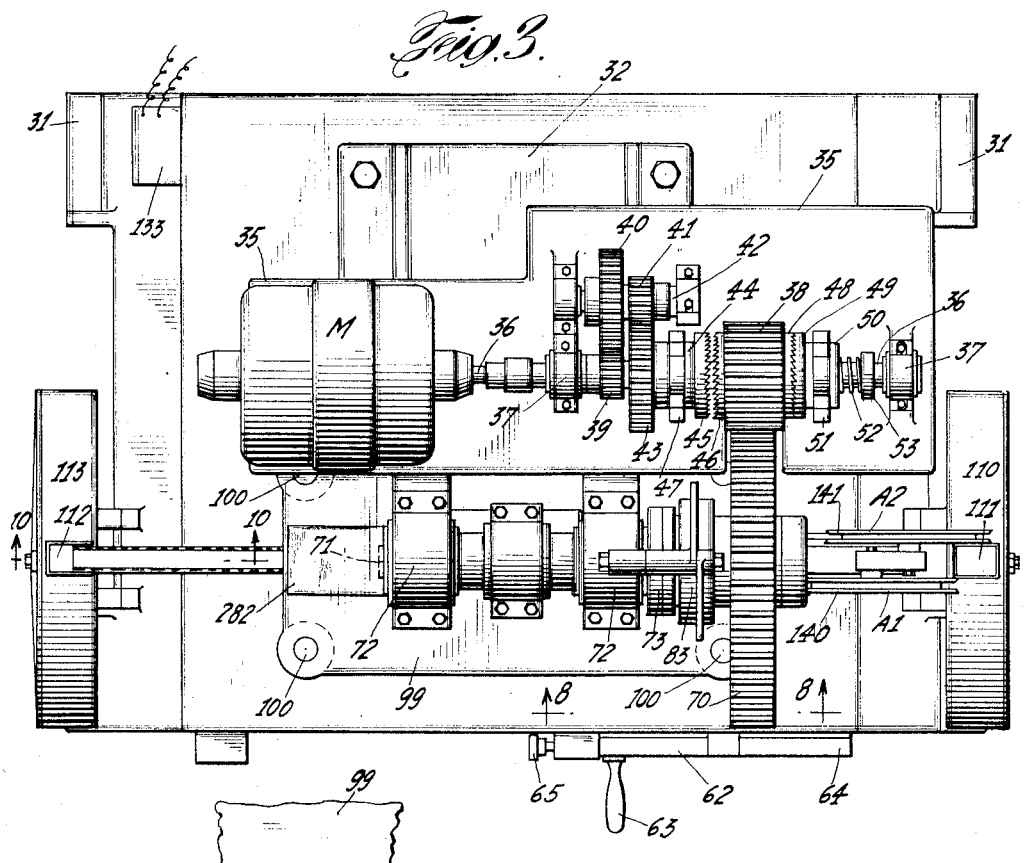

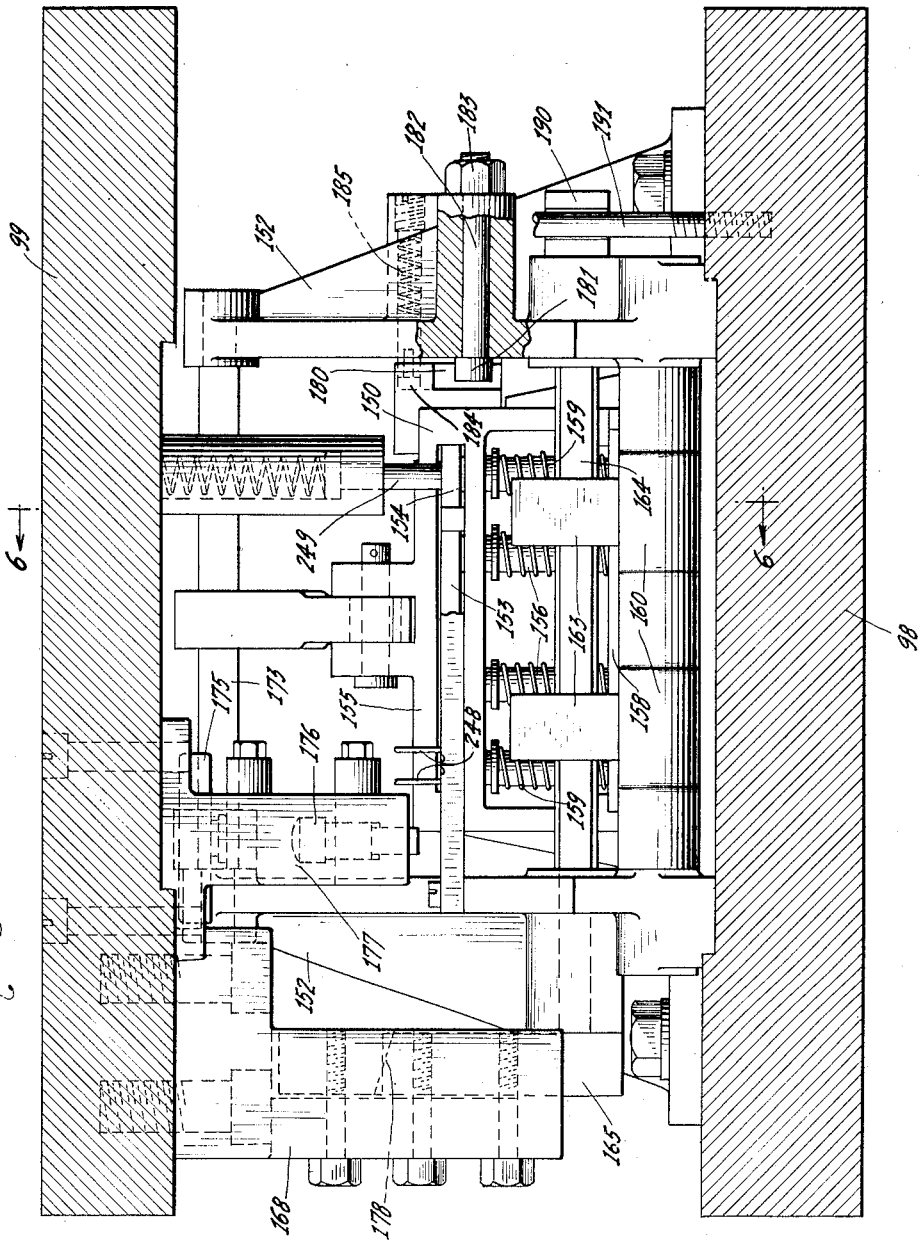

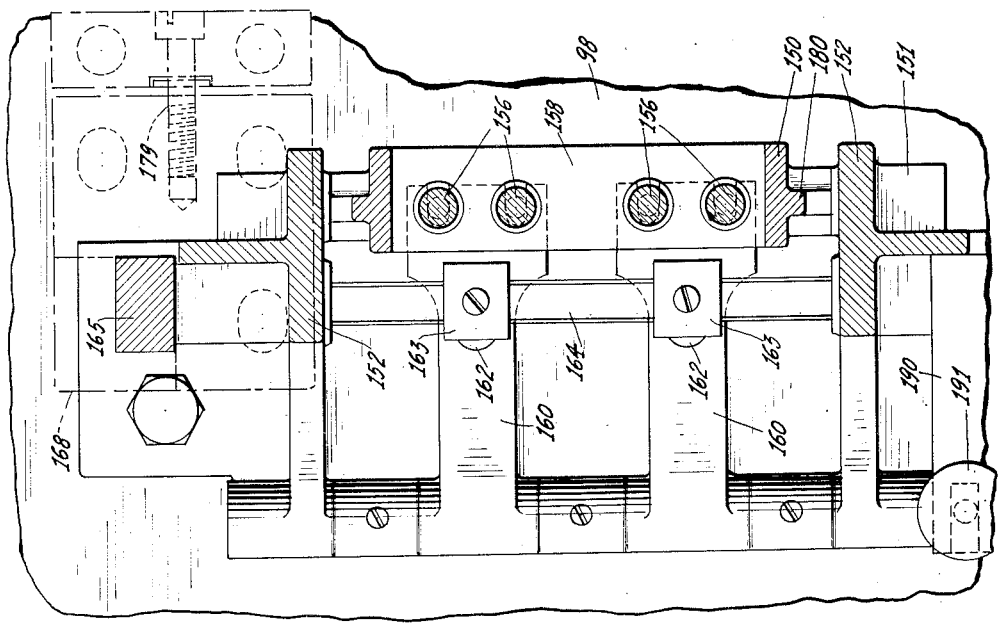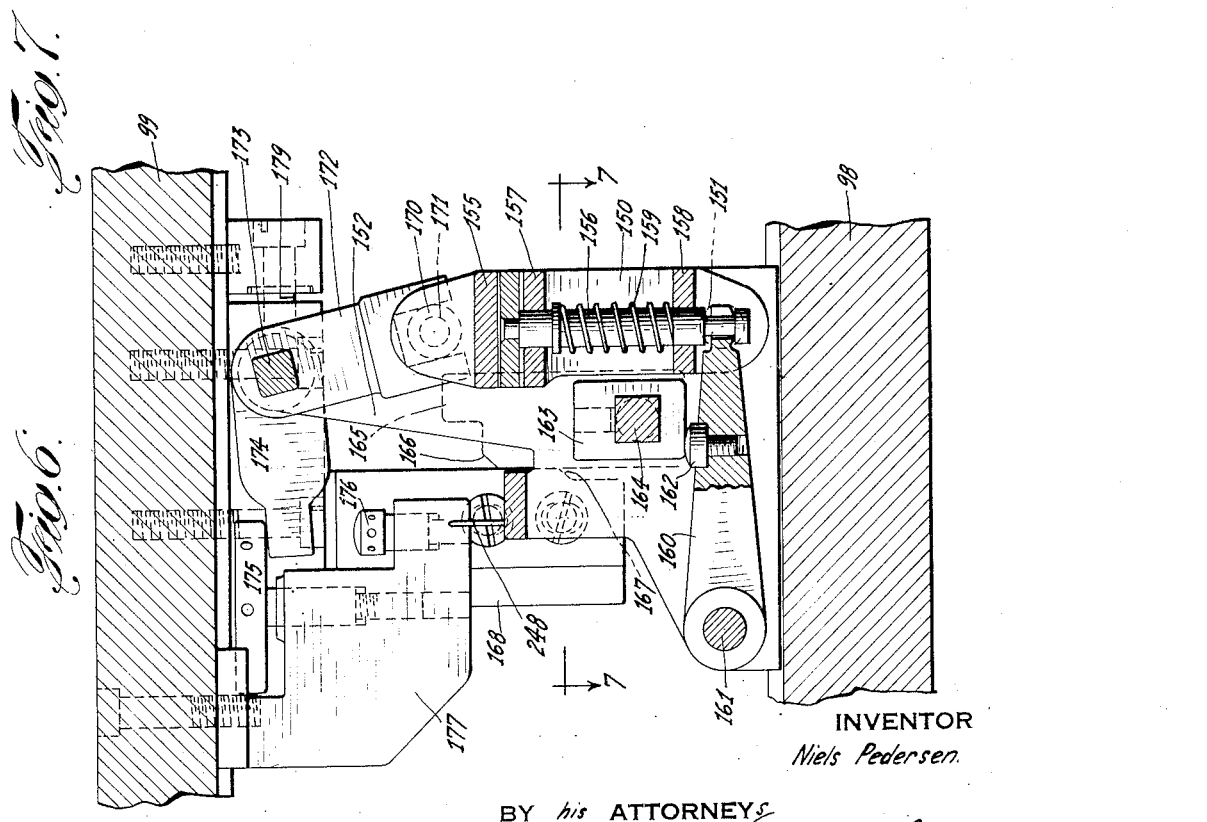

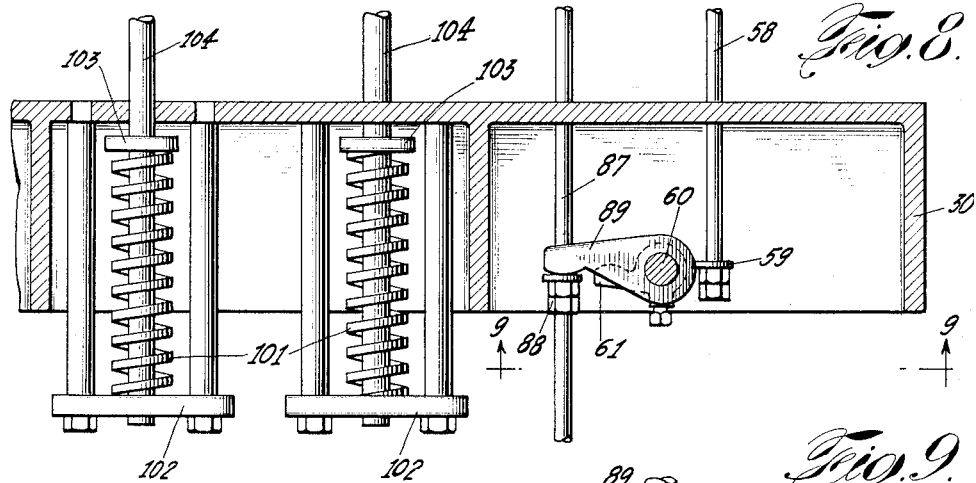
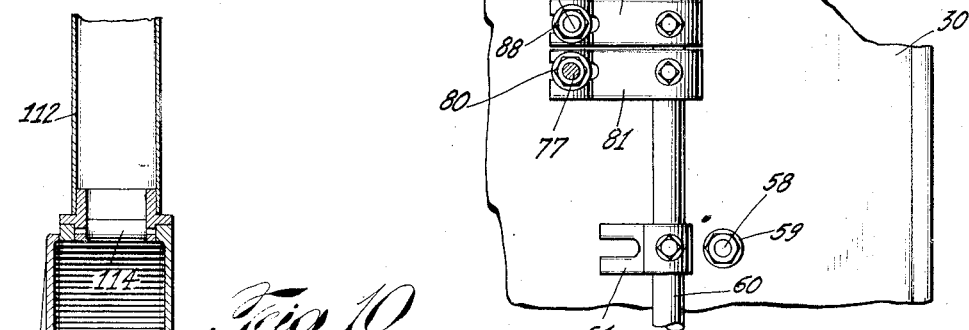
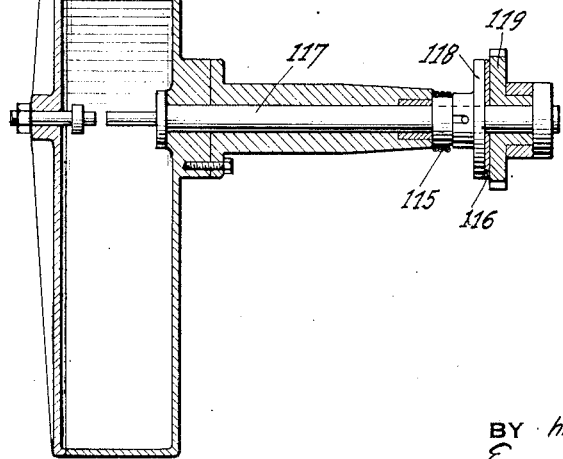
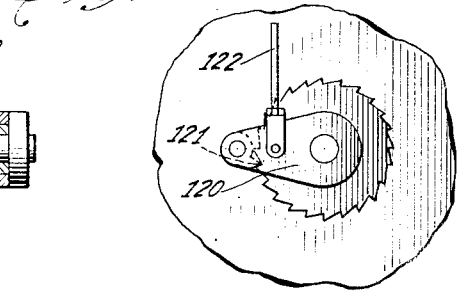
INVENTOR
Niels Pedersen.
BY his ATTORNEYS
Emery, Booth, Varney & Whittemore

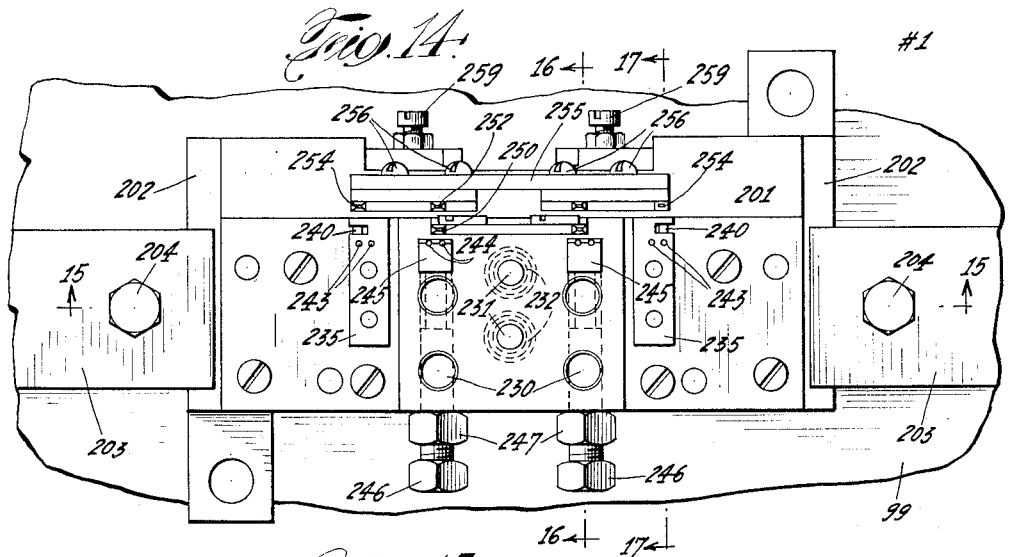
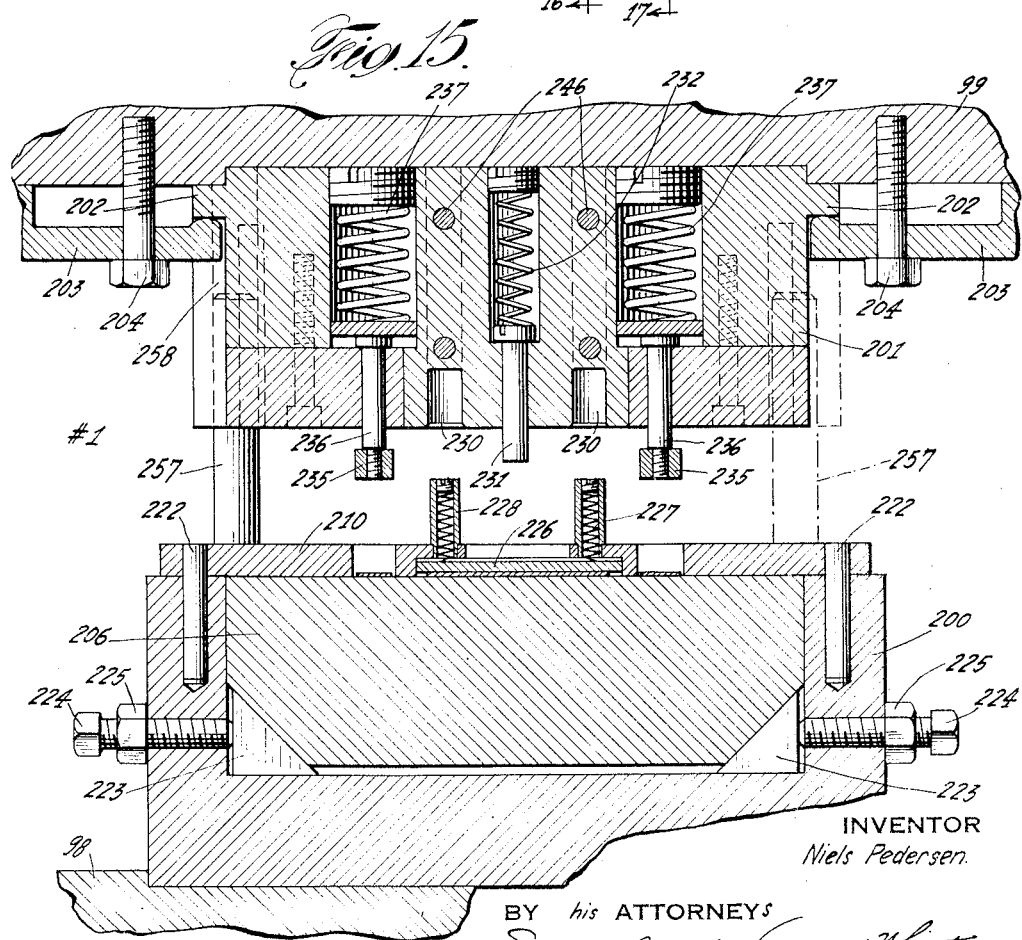

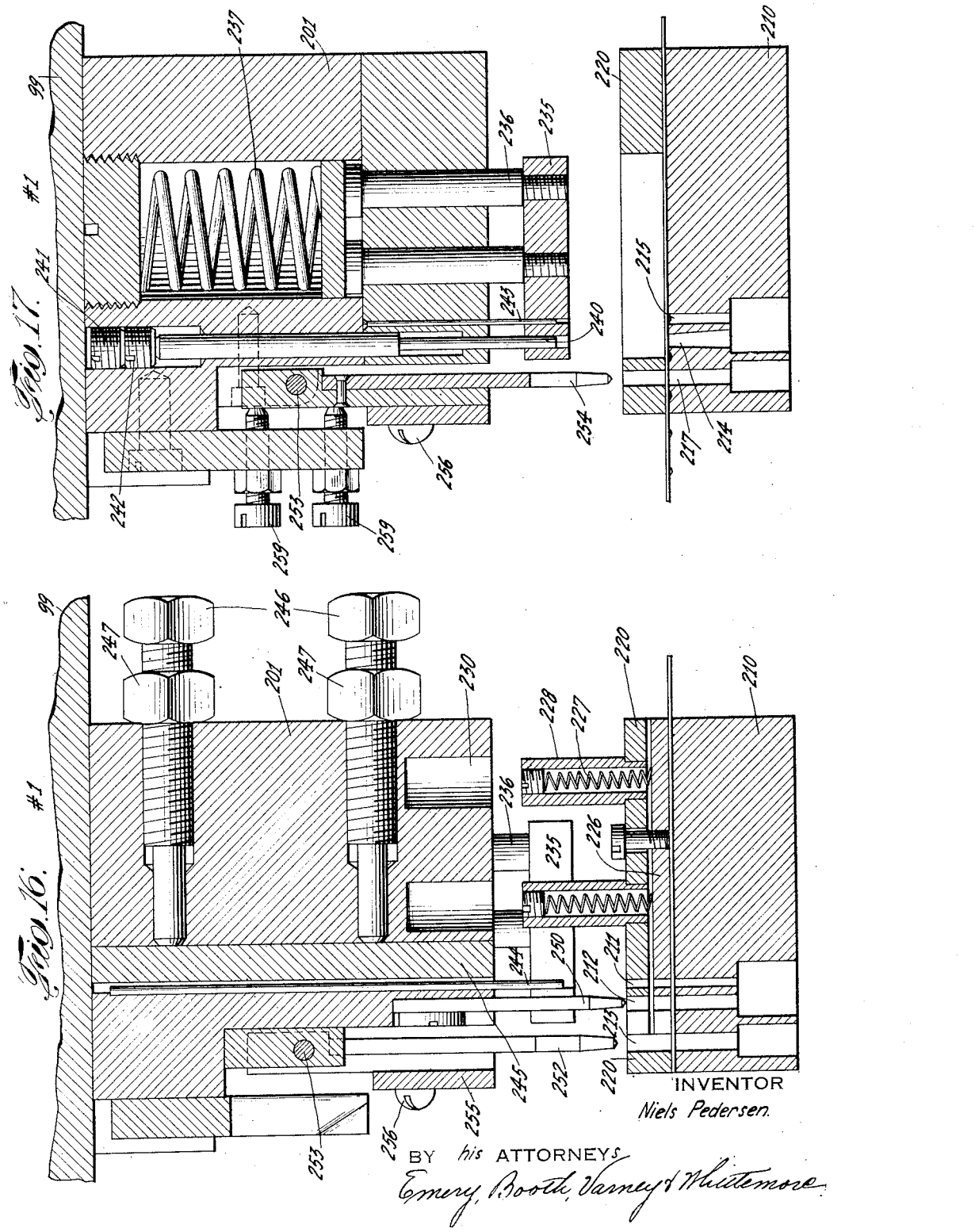

Jan. 16, 1934.    N. PEDERSEN    1,943,990
REENFORCING CINEMATOGRAPH FILM
Filed May 28, 1931    12 Sheets-Sheet 10
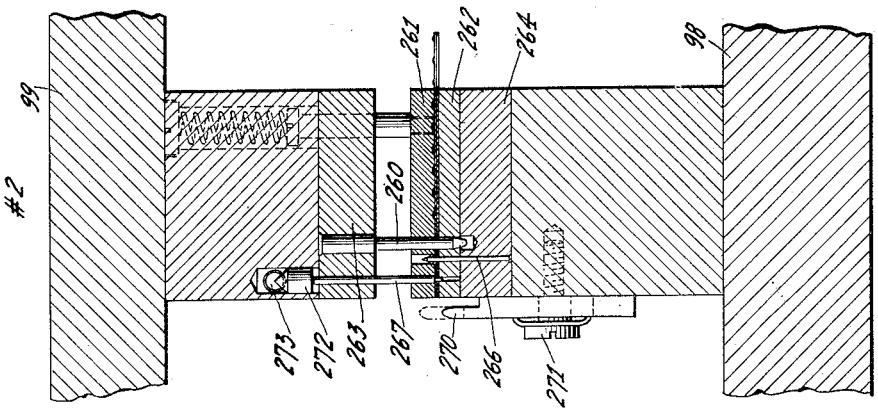
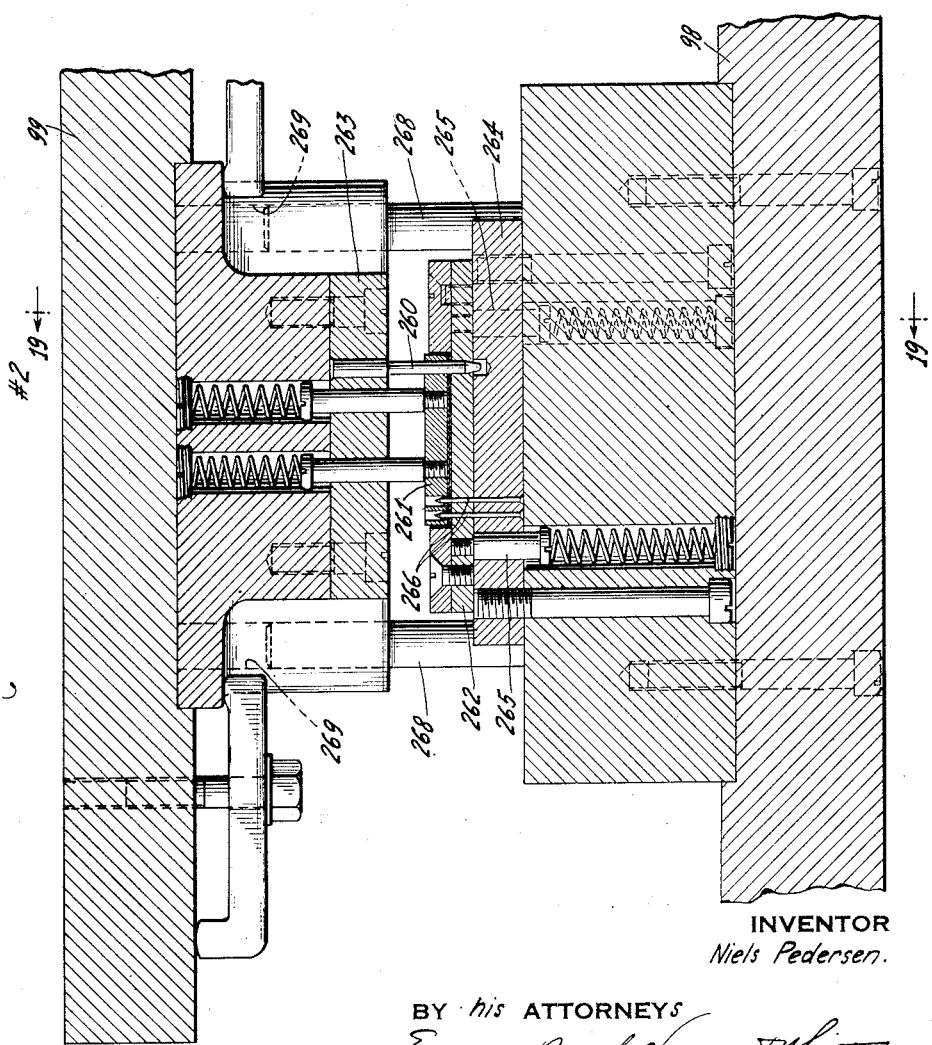
INVENTOR
Niels Pedersen.
BY his ATTORNEYS
Emery, Booth, Varney & Whittemore

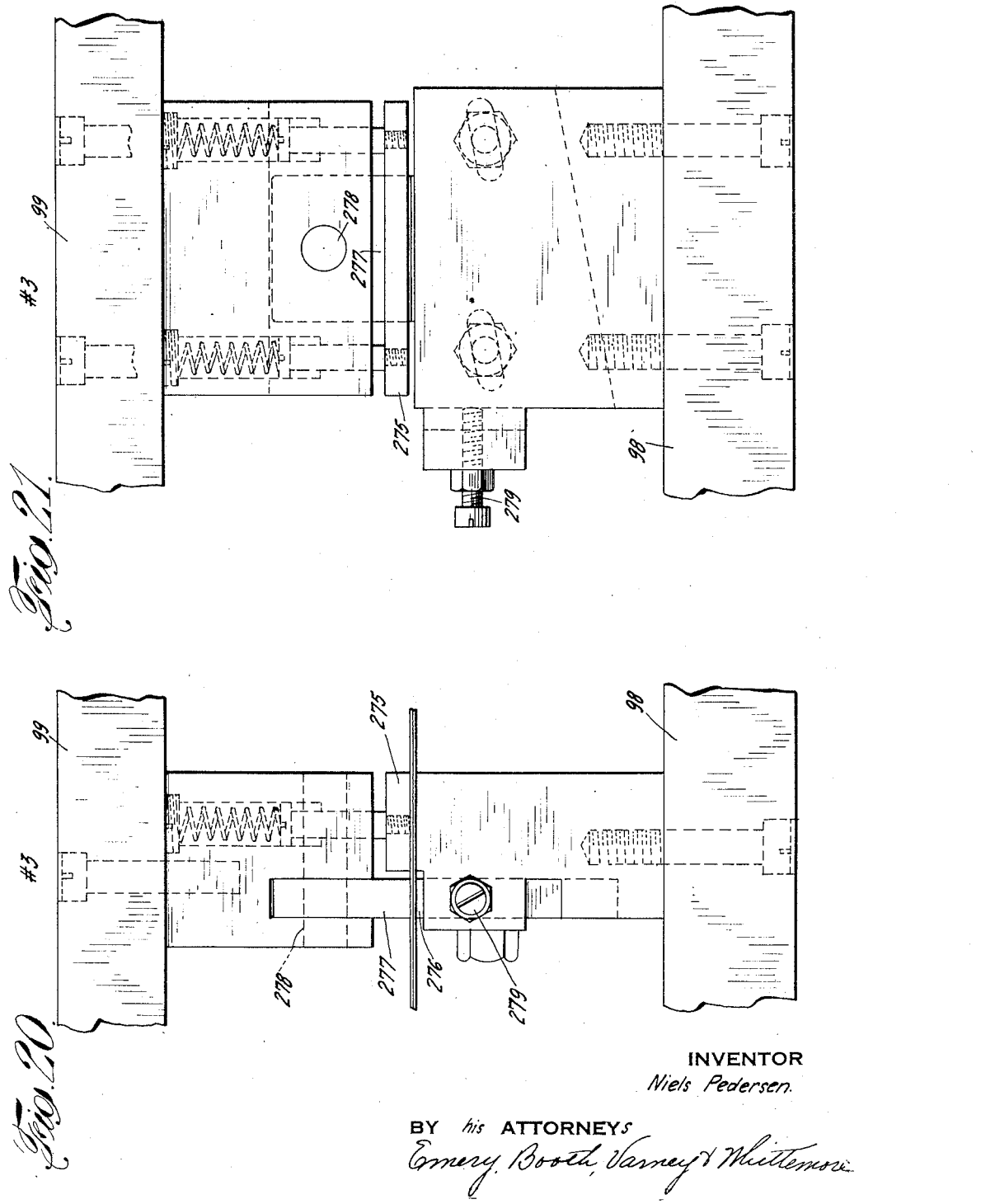

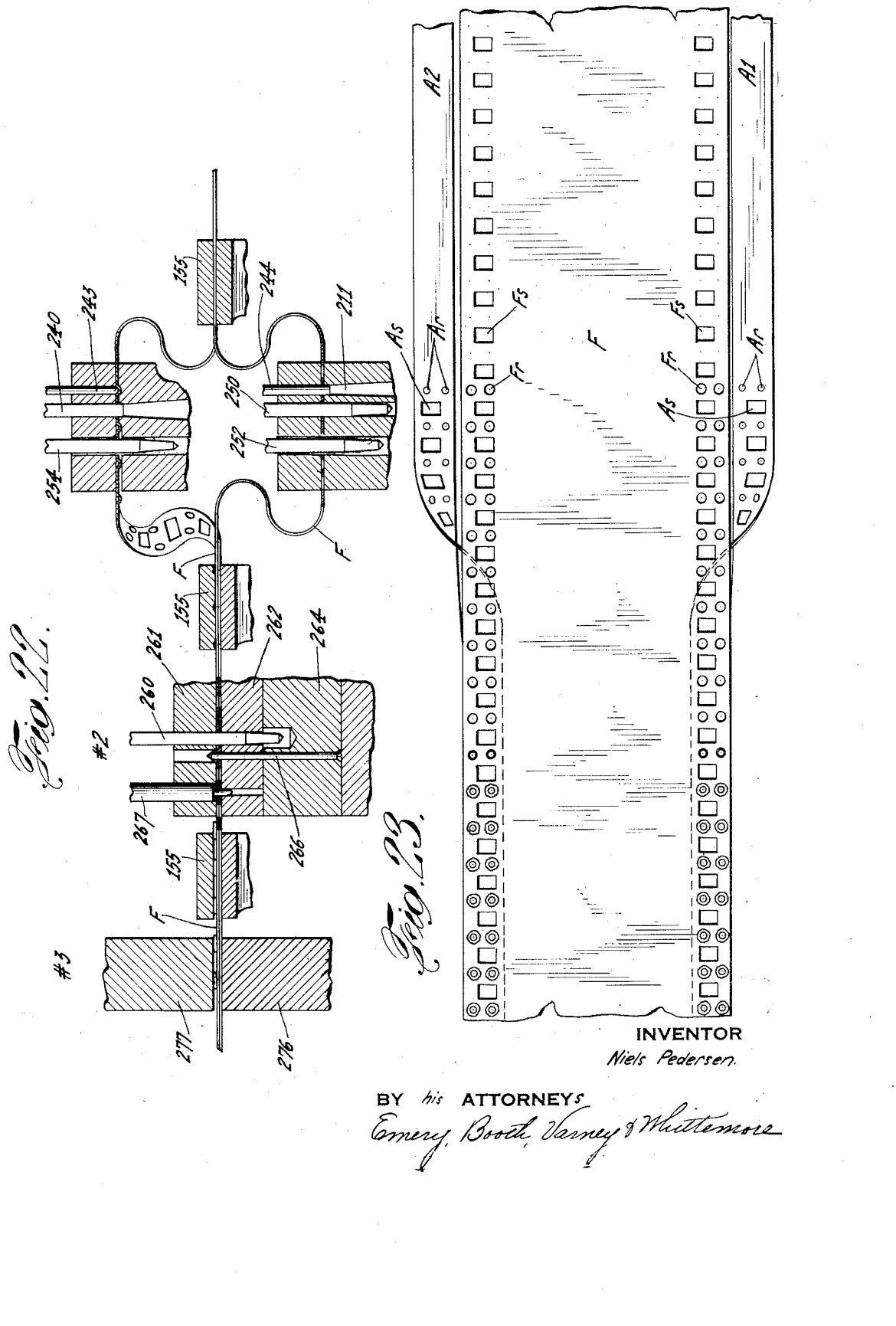

Patented Jan. 16, 1934

1,943,990

UNITED STATES PATENT OFFICE 1,943,990

REENFORCING CINEMATOGRAPH FILM

Niels Pedersen, Marion, Pa., assignor to Armoured Films Limited, London, England, a corporation of Great Britain Application May 28, 1931. Serial No. 540,563

17 Claims. (Cl. 1—2)

This invention relates to the art of reenforcing cinematograph film or similar strip and has for an object the provision of improved apparatus and process for reenforcing or armoring such strip, and the improved article produced thereby.

In my copending application Serial Number 504,302, filed December 23, 1930, I have disclosed certain method and apparatus for armoring strip and the present invention is related to and partially an outgrowth of that development, though it constitutes an improvement thereover and in some aspects departs from the general principles thereof.

It has heretofore been proposed to reenforce cinematograph or motion picture film strip to make it stronger and more durable, it being well known that unarmored strip is easily torn or mutilated by the sprocket teeth of strip feeding apparatus. Notwithstanding the attention given the problem in the past, armored film has not yet come into general use. Apparently this is due to imperfections in the previous methods of armoring and deficiencies in the apparatus for applying the armor to the strip.

For the successful application of armor to film strip account must be taken of shrinkage. The film strip when new is punched to a certain standard gage between sprocket holes. When aged to the point at which the armor may be applied most advantageously—that is, after the developing and other initial conditioning processes which are responsible for practically all of the shrinkage—the film strip is considerably shorter between sprocket holes than the standard unit. If now the armor strip is punched according to the standard unit it will be too long for the film strip so will produce a composite strip which is buckled or which has a strong tendency to form spiral convolutions of such short length as to interfere with its proper use.

According to the previous application referred to, this trouble was overcome by measuring the shrinkage of any given film strip, adjusting the armor applying apparatus correspondingly and applying the armor according to this adjustment. This proved satisfactory where the shrinkage was uniform or substantially uniform from end to end, but not otherwise. If the variations in shrinkage were small it was possible to measure the strip at a number of places and to set the machine for the average of these measurements. This did not work well where the variations were large. According to the present invention the armor strip is applied in such a manner as to make each unit fit the unit of film strip to which it is actually applied and this is done automatically, thus avoiding manual measuring and adjusting.

The invention also provides improved apparatus capable of operating at very high speed without injury to either the strip or the apparatus. The apparatus is also made more durable and greatly simplified. Without attempting to catalog all of the objects and advantages I will proceed to a description of an illustrative embodiment of apparatus built according to the invention to enable others to understand the nature of the invention and the manner of its practical application. In the accompanying drawings of this illustrative embodiment:

Fig. 1 is a front elevation of the entire apparatus;

Fig. 2 is a right end elevation reference being made to Fig. 1;

Fig. 3 is a top plan view;

Fig. 4 is a front end elevation of a strip feeding device;

Fig. 5 is a left side elevation of the same;

Fig. 6 is a vertical section taken on the line 6—6 of Fig. 5;

Fig. 7 is a horizontal section taken on the line 7—7 of Fig. 6;

Fig. 8 is an enlarged vertical section taken on the line 8—8 of Fig. 3;

Fig. 9 is a section taken on the line 9—9 of Fig. 8;

Fig. 10 is a section taken on the line 10—10 of Figs. 3 and 11 to show the strip winding mechanism;

Fig. 11 is a right end elevation of Fig. 10;

Fig. 14 is a plan view of the punch mechanism taken on the line 14—14 of Fig. 12;

Fig. 15 is a section taken on the line 15—15 of Figs 13 and 14;

Fig. 16 is a section taken on the line 16—16 of Figs. 13 and 14;

Fig. 17 is a section taken on the line 17—17 of Figs. 13 and 14;

Fig. 18 is a vertical section through the punch and die mechanism at the second operating station;

Fig. 19 is a section taken on the line 19—19 of Fig. 18;

Fig. 20 is a front end elevation of mechanism at a third operating station;

Fig. 21 is a side elevation of the same;

Fig. 22 is a diagrammatic view to show the order of the several operations; and

Fig. 23 is a diagrammatic view showing the steps of the process as exhibited by the film and armor strips.

Figure 12:
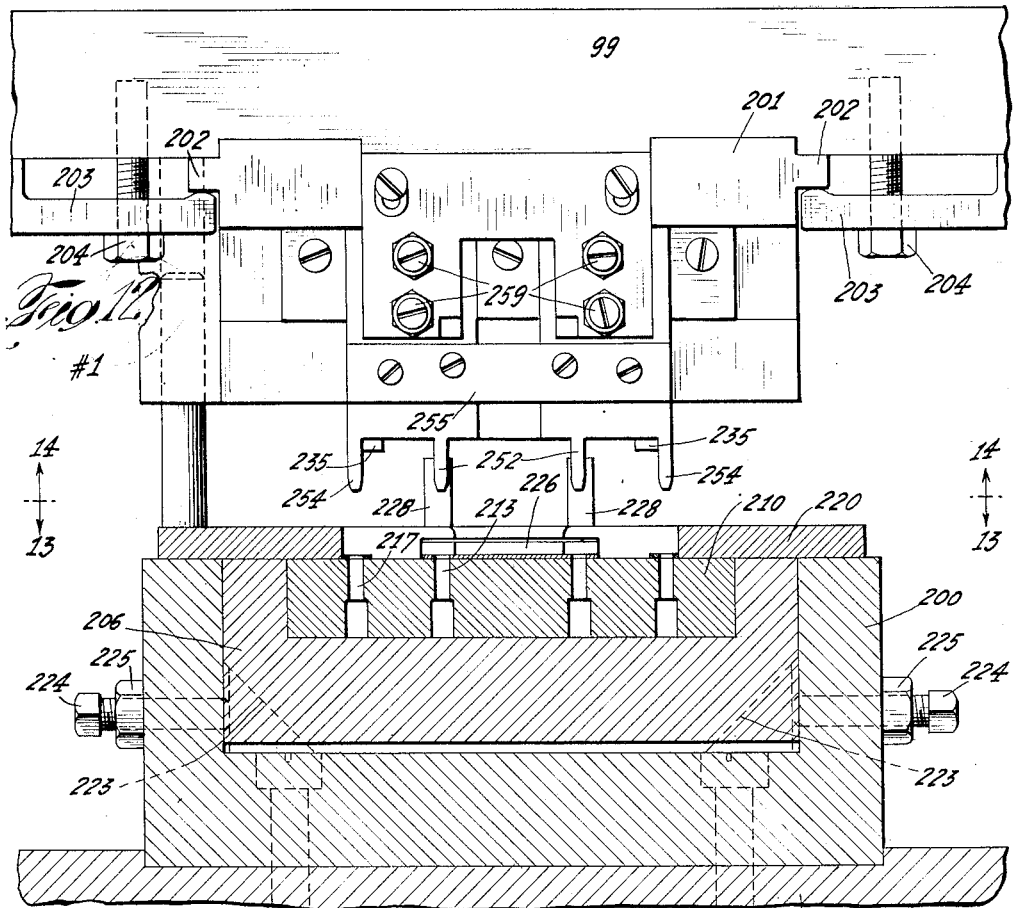
Fig. 12 is a section and elevation of punch and die mechanism at the first operating station.

The machine which is shown in the drawings takes film strip which is provided with sprocket holes on either side together with armor strips of bronze or other desired metal which are flat and smooth and assembles them together in such a way that the armor strip is made to fit the film strip exactly, unit for unit. In doing this the armor strip is punched to form sprocket holes which coincide with the sprocket holes of the film strip when the strips are assembled. The armor strips are also punched to form hollow rivets which are bradded on the opposite side of the film strip to secure the strips together. The machine provides for automatically locating the punchings of the armor strips by reference to the portion or unit of the film strip which they are intended to fit.

These several operations may be carried out in various ways but, as is evident from Fig. 22, the present machine performs all the operations upon the strips at three positions or stations and by movement of a single crosshead. At position #1 the film strip F is punched to form rivet holes Fr therein, the film strip and armor strips A1, A2 are matched, the sprocket holes As are punched in the armor strips after matching and at the same time protuberances Ar which are to form hollow rivets are punched in the armor strip. At the second position #2 the film and armor strips are assembled by super-imposing the film strip upon the armor strips—the armor strips having been turned upside down between position #1 and position #2 so as to cause the protuberances to lie uppermost where the rivet holes in the film strip will fall readily thereover—, the rivet protuberances are punched through the armor strip, and the rivets are turned. At position #3 the rivets are bradded. As shown in Fig. 1 feeding devices are placed in front of each position to move the strip along intermittently.

*Supporting frame*

All of the mechanism is supported upon a table 30 supported upon legs 31. A standard 32 bolted to the table carries the driving mechanism.

*Driving mechanism*

A motor M is mounted upon a shelf 35 bolted to the top of the standard. The shaft 36 of the motor is mounted in suitable bearings 37 secured to the shelf 35. Loosely mounted upon the shaft 36 is a gear 38 adapted to be driven either directly from the motor shaft or through reduction gearing of any desired kind. The gearing shown comprises the gear 39 fast on the motor shaft, the gears 40, 41 fast on a jack shaft 42 and the gear 43 which is fast on the low speed clutch sleeve 44. The sleeve 44 is loosely mounted upon the shaft 36 and is also slidable thereon so as to engage the mating clutch teeth 45, 46 on the sleeve 44 and hub of gear 38 respectively when the sleeve is moved to the right by a yoke lever 47. When the drive is direct the similar teeth 48, 49 on the other end of the hub of gear 38 and on a high speed clutch sleeve 50 respectively are engaged. The sleeve 50 is splined to the shaft 36 and is moved by a yoke lever 51. A spring 52 presses against the end of sleeve 50 and a fixed collar 53 to keep the drive normally direct or in high speed. The yokes 47 and 51 are pivoted at 54 and 55 respectively and are provided with extensions therebelow which are connected by a link 56. An operating lever 57 which is rigidly connected to the lever 47 causes operation of that lever and through the link 56 of the other lever 51 as well. A rod 58 is connected to the lever 57.

As shown in Figs. 8 and 9, the rod 58 extends downward and at its lower end is provided with an enlargement in the form of a nut 59 which is engaged when the change speed shaft 60 turns over by a gear change fork 61 to put the mechanism into low gear. The parts tend normally to stay in high gear. The shaft 60 is operated by a member 62 fast on its front end, which member or bar is provided with a handle 63 and with pin sockets 64 for engagement by a spring pressed detent pin 65.

The gear 38 on the motor shaft is in mesh with a gear 70 loose on a crank shaft 71 mounted in bearings 72. Fast on the shaft 71 is a brake-clutch device 73 of well known type such as is described in the aforementioned application, the clutch being of the detent type in which the hub of gear 70 supplies one of the cooperating parts. For the present purposes it is sufficient to know that when the spring pressed plunger 74 (Fig. 2) is withdrawn the clutch is engaged and the shaft 71 is turned until the plunger is returned as by a spring. The plunger 74 is connected to a bell-crank lever 75 pivoted at 76 and operated by a rod 77. The rod 77 is connected at its lower end to a treadle lever 78 pivoted at 79. The rod (Figs. 8 and 9) is also provided with an enlargement in the form of a nut 80 engaged by the fork 81 on shaft 60 to keep the clutch permanently engaged in the high speed position (the position illustrated).

There is also provided (Fig. 2) a brake cam 82 to release the spring-closed brake bands 83. The cam 82 is carried upon a shaft to which is affixed a lever 84 operated by a link 85, a bell-crank lever 86 and a rod 87. The rod 87 has an enlargement on its lower end in the form of a nut 88 which is engaged by the fork 89 (Figs. 8 and 9) carried by the shaft 60 when the parts are in high speed position to hold the brake open.

The crank shaft 71 actuates a pitman rod 95 which at its lower end is connected by a ball joint to a crosshead 96 guided in vertical adjustable slides 97.

The single pitman rod actuates all of the punch mechanism and, for convenience, all of the punch and die blocks are mounted in a single assembly comprising the base block 98 which is secured to the table, the upper block 99 which is secured to the cross-head 96 and the guide pins 100 which keep the blocks accurately alined and assembled together whereby the whole assembly may be removed as a unit.

The punch mechanism must maintain an accurate stop position on the down stroke so the weight of the crosshead, upper block and associated reciprocating parts are balanced and urged lightly upward by springs 101 (see Fig. 8) resting upon seats 102 and pressing upward upon collars 103 fast on rods 104 secured to the upper block 99.

*The reeling mechanism*

The film supply reel is placed in a fireproof box 110 secured on the right legs of the machine. The film passes upward through a tube 111 and after being armored passes down on the left side into a tube 112 and thence into a similar fireproof box 113. As shown in Fig. 10, fireproof rollers 114 prevent spread of fire to the rolls of film in the boxes.

The take-up reel is driven at sufficient speed to wind up all film strip processed when the strip is being wound on the smallest diameter or hub thereof. The drive means, therefore, will provide for slippage as the diameter builds up with additional film. The means herein provided for accomplishing this comprises a shaft 117 keying into the hub of the reel, and facing friction discs 118, 119 which are pressed toward each other by a spring 115 against an intermediate friction disc 116. One of the discs 118 is fast on the shaft 117 and the other 119 is loose thereon. The loose disc is provided on its periphery with ratchet teeth and adjacent the same there operates an oscillating arm 120 provided with a pawl 121 acting upon the teeth. A rod 122 secured to the arm 121 at its lower end is guided through the table 30 near its upper end and is urged upward by a spring 123 engaging a collar 122a thereon. The rod is actuated by an adjustable plunger pin 124 on the down stroke of the block 99 to turn the reel at each reciprocation of the punches.

Safety stop mechanism

It takes some time to rethread the machine if all the strip feeds through so it is desirable to provide means for automatically stopping the machine when the strip is exhausted and before the tail end has entered the operating mechanism. The means herein provided for accomplishing this comprises, as shown in Figs. 1, 2 and 3, two fiber rollers 125 mounted upon the short end of a multiplying bell crank lever 126 in position to roll upon the upper surface of the film strip. A spring 127 on the bell crank shaft 128 holds the roller 125 down upon the film strip. In this position the other end of the bell crank lever which is provided with a catch 129 holds a fiber contact disc 130 against rotation which it would otherwise have on account of means provided for so influencing it. In this position the disc 130 presents a metal insert 131 to electrical contacts 132. The contacts are connected to stop means in a control box 133 on the left end of the machine.

If the film breaks or the length of film strip is exhausted the rollers 125 drop down, causing the catch 129 to release the disc 130 thus permitting the latter to rotate until the metal insert 131 has moved away from the contacts 132 and broken the safety circuit to stop the motor.

The machine will stop after the safety device operates when the end of the film has passed a certain distance beyond the rollers 125. A cutting knife 135 is mounted upon the splicing table 136 near where the end of the strip will stop. There the strip may be raised and cut and a new length spliced on. Pins 137 are provided on the table at the proper distance from the knife to cause the cut to come at the correct place with respect to the sprocket holes and also to cause the two ends when assembled to fall into proper position to preserve the correct spacing of the sprocket holes. Positioning pins 138, which may be clamped in either the upper (active) position or the lower (inactive) position cooperate with the pins 137 to hold the adjacent ends of the film strips in proper position for splicing.

Similarly the armor strips A1 or A2 coming from supply reels 140, 141 may be cut and soldered upon the table 136, though in this case the spacing agents are not required since the armor strip has not yet been punched when it arrives at the table.

Strip feeding mechanism

In my previous application strip feeding devices were employed having picker pins which engaged the sprocket holes of the strip. This proved satisfactory at moderate speeds but the present machine is run at about twice the speed of the former machine and in this case if picker pins be used they will often tear the holes. Herein I have provided feeding mechanism which has broad surface contact with the strip to prevent tearing or deforming it. Briefly it may be described as comprising mating flat plates which grip the strip and release it in proper sequence and time to hold it securely while the frame in which the plates are mounted moves to and fro longitudinally of the axis of the strip to feed it. The plates grip the strip while the frame moves forward in feeding direction and release it when the frame returns.

The feeding mechanism is the same for each operating position except that at the third station where the armor and film strips have been combined there will be only one pair of clamp plates instead of three pairs as will be described hereinbelow.

In the specific embodiment of this apparatus shown in Figs. 4 to 7 a rocking feed frame 150 is mounted upon journals 151 at its lower end, which journals operate in bearings in fixed brackets 152 secured to the base block 98.

The film and armor strips pass above the three clamp plates 153 (for the film) and 154, 154 (for the armor) and beneath the fixed plate 155. The plates 153, 154 are secured to studs 156 guided in holes in spaced bars 157, 158 and are constantly urged upward by springs 159. The studs and clamp plates are urged downward to release the strips when the crosshead descends to perform the punching operations by the following mechanism. Arms 160 which are pivoted upon a transverse shaft 161 are forked at their outer ends to engage heads formed on the lower ends of the studs. Hardened wear plugs 162 are set into the arms and these plugs are engaged by hardened cams 163 secured upon a cam shaft 164. At its rear end the cam shaft is provided with a cam lever 165 formed with a cam surface 166 which is engaged by a similar cam surface 167 formed on a cam bracket 168 secured to the upper block 99. The cam 167 is vertically adjustable (Fig. 5) by an inclined block 178 and the whole bracket assembly is adjustable by a bolt 179 turnably anchored in a suitable block.

The frame 150 is rocked by the following mechanism. A roller 170 placed on a shaft 171 attached to the upper end of the rocking frame is engaged by the forked end of a rock arm 172 fast on a shaft 173 journaled in the fixed brackets 152. At its rear end the shaft 173 has secured thereto a strike arm 174 whose outer end is alternately engaged by adjustable strike studs 175, 176 secured to a bracket 177 attached to the upper block 99.

Since some play may develop between the roller 170 and its operating fork in the arm 172 means are provided for accurately limiting the travel of the rocking feed frame 150. As herein illustrated these means comprise a rib 180 formed on the front end of the frame side and adjustable eccentrics 181 formed on the turnable rods 182 disposed on either side of the rib. The rods are held in turned positions by lock nuts 183.

Due to the rapid action there may be some rebound when the rib strikes the eccentric stops so to prevent this I have provided a friction drag 184 provided with a fiber tip and pressed inward by a spring 185 into engagement with a smooth face on the end of the rock frame 150.

At times as when threading up it may be desirable to prevent feeding. For this purpose a lever 190 is secured upon the front end of the cam shaft 164 and the end of the lever is locked down by a set screw 191. This prevents clamping of the strip and consequently prevents feeding.

*Mechanism at position #1*

Figure 13:
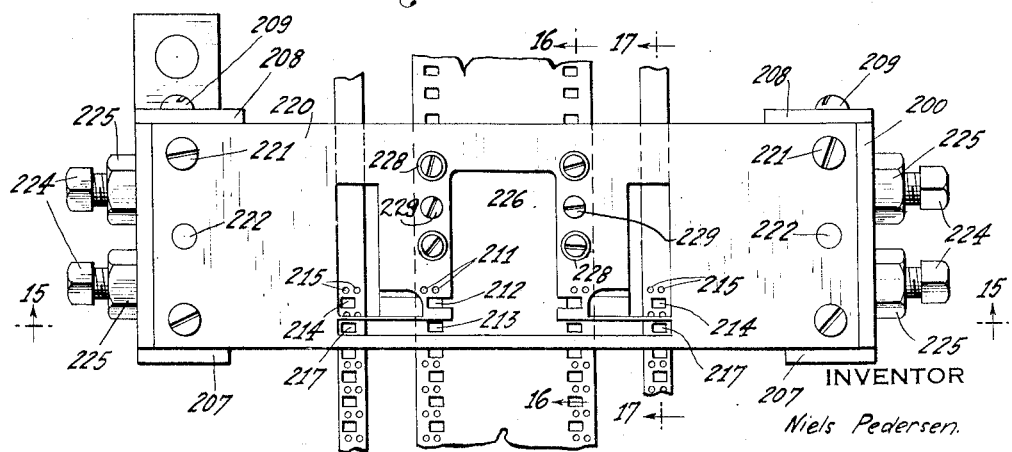
Fig. 13 is a plan view of the die mechanism taken on the line 13—13 of Fig. 12.

This mechanism is shown in Figs. 12 to 17 and in the particular embodiment illustrated includes means for punching rivet holes in the film strip, means for punching sprocket holes and rivet protuberances in the armor strips and means for matching the armor strips, unit by unit, with the film strip.

The die assembly is mounted on a U-shaped bottom block 200 secured to the base block 98 by any suitable means. The punch assembly is carried by a punch block 201 provided with side flanges 202 by which it is secured with clamp plates 203 and cap bolts 204 to the upper block 99.

Within the bottom block 200 there is disposed a die base block 206 which may be inserted from the side until it comes against the fixed stops 207 after which the clamp plates 208 are brought up by screws 209 to hold it. Secured upon the die base block is a hardened die block (or blocks) 210 provided with film rivet punch holes 211, fixed film pilot pin holes 212, slightly oversized shiftable film pilot pin holes 213, armor sprocket punch holes 214, armor rivet punch holes 215, and shiftable armor pilot pin holes 217. The various holes are positionally indicated in Fig. 13 and shown in section in Figs. 16 and 17.

The lips of the punch holes of the dies may become worn and require resizing. If the punches just barely enter the holes—and this is the present arrangement—the punch holes may be resized by grinding off a thousandth or two of the upper side of the die block. But the upper surface of the die block should always come to the same level. To accomplish this a top plate 220 is secured to the bottom block 200 by screws 221 and dowels 222. The lower corners of the die base block 206 are beveled to engage wedge blocks 223 which when pressed inward by set screws 224 raise the block 206 up until the die blocks come against the top plate 220. The set screws are held in position by lock nuts 225.

The film strip is held down by a tension plate 226 pressed down by light springs 227 disposed within barrels 228 mounted upon the top plate 220. Stop screws 229 hold the plate 226 to the top plate 220. Recesses 230 are provided in the punch block 201 to receive the spring barrels. When the punch assembly descends auxiliary plungers 231 having heavier springs 232 come down upon the tension plate and place a heavy clamping pressure upon the film strip before it is punched. This eliminates all buckling in the portion of the film strip which is being operated upon.

The armor strips are clamped before being punched by clamp plates 235 secured to the lower ends of plungers 236 which are pressed down by springs 237. Armor sprocket hole punches 240 are tightly fitted in holes and are adjusted in position by nuts 241, 242. Armor rivet protuberance punches 243 are secured behind the sprocket hole punches at a predetermined distance. The latter punches are merely rounded upon their ends since they are not required to punch through the strips.

Film rivet hole punches 244 are secured by clamp plates 245 held by set screws 246 and lock nuts 247. These punches are directly in line with the armor rivet punches 243 and are the same distance behind the fixed film pilot or drift pins 250 as the rivet protuberance punches 243 are behind the sprocket hole punches 240. In other words, the rivet punches for film and armor strips are exactly aligned and the fixed film pilot pins and the armor sprocket hole punches are exactly aligned transversely of the strips.

I will now describe the means which I have provided for accurately matching the armor strip to the film strip for each unit of length. The sprocket holes Fs are already present in the film strip when it comes to the #1 position. The distance between them may vary due to shrinkage. The armor strips have not been punched at all so each sprocket hole of the armor strip immediately after being punched is utilized to locate the next one to be punched. The fixed film pilots 250 enter the sprocket holes of the film strip before it is tightly clamped. The feeding devices previously described have brought the film strip forward almost but not quite the distance required so the pilot pins bring it up the remaining small distance. In front of each fixed pilot pin there is disposed a shiftable film pilot pin 252 mounted to turn about a pivot center 253. Rigidly secured with the pin 252 and transversely aligned therewith is a shiftable armor strip pilot pin 254. After the fixed film pilot pin locates the film strip the shiftable film pilot pin enters the next sprocket hole and is thereby given a shifted position and held there. The shiftable armor pilot pin being rigid with the shiftable film pilot pin enters the sprocket hole just punched in the armor strip and shifts it to correct position—this being possible since the armor strip is not clamped yet. But as soon as it is positioned the armor strip is clamped in position and immediately thereafter is punched. Since the shiftable pilots for armor and film strips are aligned and the fixed film pilot and the armor sprocket hole punch are aligned, it follows that the distance between sprocket holes punched in the armor strip will be exactly the same distance as the distance between corresponding sprocket holes of the film strip on that side.

This provides for matching each armor strip with the row of sprocket holes of the film strip on the side with which it will be assembled. This may work to advantage, if the two rows of sprocket holes in the film strip are not exactly matched because of uneven shrinkage or any other cause; but usually the two rows will be substantially matched so the shiftable pilots for both sides may be yoked together as by a bridge plate 255 secured by screws 256.

The swinging of the shiftable pilot pins is so sudden that they are likely to injure the edges of the sprocket holes if their movement is not controlled. For this purpose I provide means such as the set screws 259 for limiting the movement of the pilot pins in either direction. The movement while limited is still greater than the largest shrinkage which has yet been found, to permit proper functioning at all times.

The punch assembly and the die assembly are aligned by a plurality of guide pins 257 fitting guide bores 258, which arrangement also permits the whole unit to be removed and replaced together without disturbing the relationship of the parts.

Between position #1 and position #2 the film and armor strips are provided with loops as is usual in feeding light strips. The armor strips are also turned upside down in order that the protuberances may come uppermost and so the mechanism at station #2 may work to the best advantage.

Guides 248 are provided adjacent at least the first two feeding devices and, if desired, armor strip clamping devices 249 (Fig. 4) also for preventing backward movement of the strip, it being remembered that the feed frames swing backward when the punching operations take place.

Mechanism at position #2

This mechanism is shown in Figs. 18 and 19. It is so similar in all respects to corresponding mechanism described minutely in the aforementioned application that no detailed description is believed to be needed here. It includes pilot pins 260 for assembling and positioning the strips, floating spring pressed clamping plates 261, 262, the upper of which 261 descends with the upper block 263 while the lower 262 which is mounted on the lower block 264 ascends only a limited distance as permitted by the spring pressed studs 265. This causes the strips after assembly to be clamped, and then by subsequent downward movement to be impaled upon the piercing punches 266 to form hollow rivets which are located in the rivet holes of the film strip. A burr turning punch 267 clinches the rivets upon the film strip. This is adjusted as to its downward travel by an abutment block 272 tapered on its upper end and cooperating with a set screw 273 which is similarly tapered on its end. This prevents injury to the strip yet permits full turning of the rivet burrs.

Pins 268 positioned in bores 269 guide the upper and lower blocks and keep them accurately assembled together.

Since the strip cannot be seen when between the clamp plates a starting pilot 270 is provided to insure that the strip comes in proper position for the pilots 260. After starting it may be lowered by loosening clamp screws 271.

Mechanism at position #3

This mechanism is shown in Figs. 20 and 21. It comprises a spring pressed clamp plate 275 and an anvil 276 and a hammer 277, the latter being equalized about the pivot pin 278. The anvil may be adjusted upward upon an inclined surface by a set screw 279. The clamp plate secures the strip just before the winding mechanism operates to prevent it being pulled relative to the punches while they are operating.

A counting device 282 (Fig. 1) is suitably geared to the crank shaft 71 to indicate in feet or other convenient unit the length of strip which is processed.

The operation of the apparatus is believed to be apparent from the foregong detailed description so that no amplification by way of summary is necessary. While one embodiment of the invention has been described it is to be understood that the invention is not limited except by the prior art and the scope of the subjoined claims.

What I claim is:

1. The method of armoring film strip which comprises, forming attaching elements on the armor strip at unit lengths which are determined and fixed by and from corresponding unit lengths on the film strip which have theretofore been established, forming mating attaching elements on the film strip, the lengths on the armor strip being made the same as the corresponding lengths on the film strip, and securing the strips together at unit distances with the matched lengths imposed upon each other.

2. The method of armoring film strip which comprises, punching sprocket holes in the armor strip at distances corresponding to the distances between the identical sprocket holes with which they are to be associated as gaged directly from the latter, applying the armor strip to the film strip with each unit of length coinciding and attaching the armor strip to the film strip at each unit of length.

3. The method of armoring film strip which comprises, forming attaching elements on the armor strip at unit lengths which are determined and fixed by and from corresponding unit lengths on the film strip with which they are to be associated, and securing the strips together at unit distances with the matched lengths imposed upon each other.

4. The method of armoring film strip which comprises, forming sprocket holes in the armor strip at distances corresponding to the distances between the identical sprocket holes of the film strip with which they are to be associated as gaged directly from the latter, applying the armor strip to the film strip with each sprocket hole of the armor strip coinciding with the sprocket hole of the film strip for which it was matched, and securing the strips together in this relationship.

5. Apparatus for armoring film strip which comprises in combination, means for holding a film strip in position, means for punching an armor strip for each sprocket hole track on the sides of the film strip, and means controlled by the position of sprocket holes on each side of the film strip for separately controlling the punching of the armor strip associated therewith, the punching for each unit of the armor strip being controlled by the previous punching of that unit of the film strip with which it is to be assembled.

6. Apparatus for armoring film strip which comprises in combination, means for holding a film strip in position, means guided from a unit length of the film strip for positioning the unit length of an armoring strip which is to be assembled with the said unit length of the film strip, means for clamping said armor strip when positioned, and means for punching said matched unit of the armor strip when clamped.

7. Apparatus for armoring film strip which comprises in combination, means for holding the film strip in a temporarily fixed position, means thereadjacent for guiding the armor strip, means for punching said armor strip, means for positioning said armor strip for the punching operation, and means engaging said film strip along a given unit of length for controlling the position of said armor strip positioning means and through it the punching position of that unit of the armor strip which is to be assembled with the given unit of the film strip.

8. Apparatus for associating armor strip with film strip which is provided with sprocket holes spaced along the length thereof, comprising in combination, means for forming sprocket holes in said armor strip, gauging means taking a setting from the positions of said spaced sprocket holes in said film strip, and means responsive to said gauging means for adjusting the relative positions of said armor strip and said punching means in accordance with the spacing of the sprocket holes in the film.

9. Apparatus for armoring film strip which comprises in combination, clamping means for holding the film strip in temporarily fixed position, guide means for conducting armor strip alongside said film strip, a punch for punching sprocket holes in the armor strip, a pilot pin for positioning said armor strip, a pilot pin entering a sprocket hole of said film strip, and means operably connecting said pins for causing the first pilot pin to move and position said armor strip by movement of said second pilot pin caused by engagement with said film strip.

10. Apparatus for armoring film strip comprising in combination, means for punching rivet holes in film strip, means for punching sprocket holes and rivet protuberances in armor strip, means for piercing the protuberances through the film rivet holes, means for turning the rivets so formed, and means for bradding the rivets, all of said means being operated by the movement of a single operating head.

11. Apparatus for armoring film strip comprising in combination, means for punching an armor strip, and means for automatically positioning a given length of the armor strip in accordance with the position of sprocket holes in a given length of the film strip with which the given length of the armor strip is to be assembled.

12. Apparatus for armoring film strip comprising in combination, means for clamping the strip intermittently including a clamping strip secured to a spring pressed pin, a clamping lever for acting upon said pin to open and close the strip, a press head, and means to operate the clamping lever in accordance with the movement of said press head, said clamp lever operating means comprising adjustable striking members on said head.

13. Film armoring apparatus comprising in combination, means to operate upon the film and armor strip and means to feed said strips successively in short increments of length, said means comprising a reciprocatory feed frame, and stop means for limiting the movement of said frame at each end of its stroke, said means comprising eccentrics provided on turnable pins and means to lock said pins in turned positions.

14. Apparatus for armoring film strip comprising in combination, means to operate upon the strip, and means to feed the strip including a reciprocatory frame, a clamp device on said frame, and means to operate said clamp device including cooperating cams, and means to adjust one of said cams vertically and longitudinally to change the time of clamping and the degree of clamping.

15. Apparatus for armoring film strip comprising in combination, means for operating upon said strip and means for feeding said strip, said feeding means including a reciprocatory feed frame and a clamping device thereon, means to operate said clamping device for every operation of said operating means, and means to lock said clamping means open beyond control of said clamp operating means when desired.

16. Apparatus for armoring film strip comprising in combination, punches for operating upon the strip, a die cooperating therewith, and a die holder provided with a fixed top stop for said die in said holder to set it at correct upper position.

17. Apparatus for armoring film strip comprising a punch head, a winding shaft, a friction ratchet for said shaft, and means for operating said ratchet from said punch head at each stroke thereof whereby the length of strip which has just been completed is wound up.

NIELS PEDERSEN.